US010752752B2

(12) United States Patent
Fujita et al.

(10) Patent No.: US 10,752,752 B2
(45) Date of Patent: Aug. 25, 2020

(54) THERMOPLASTIC MODACRYLIC RESIN COMPOSITION, METHOD FOR MANUFACTURING SAME, MOLDED ARTICLE OF SAME, AND ACRYLIC FIBERS AND METHOD FOR MANUFACTURING SAME

(71) Applicant: KANEKA CORPORATION, Osaka (JP)

(72) Inventors: Masato Fujita, Hyogo (JP); Tomomichi Hashimoto, Osaka (JP)

(73) Assignee: KANEKA CORPORATION, Osaka (JP)

( * ) Notice: Subject to any disclaimer, the term of this patent is extended or adjusted under 35 U.S.C. 154(b) by 0 days.

(21) Appl. No.: 16/436,180

(22) Filed: Jun. 10, 2019

(65) Prior Publication Data
US 2019/0300675 A1 Oct. 3, 2019

Related U.S. Application Data

(60) Division of application No. 15/717,284, filed on Sep. 27, 2017, which is a continuation of application No. PCT/JP2016/059670, filed on Mar. 25, 2016.

(30) Foreign Application Priority Data

Mar. 31, 2015 (JP) ................. 2015-073161

(51) Int. Cl.
*C08K 5/41* (2006.01)
*C08F 214/06* (2006.01)
(Continued)

(52) U.S. Cl.
CPC .............. *C08K 5/41* (2013.01); *C08F 214/06* (2013.01); *C08K 5/0016* (2013.01);
(Continued)

(58) Field of Classification Search
CPC ...... C08K 5/41; C08K 5/0016; C08K 5/1575; C08F 214/06; C08L 33/20; C08L 27/06; D01F 1/10; D01F 6/40
See application file for complete search history.

(56) References Cited

U.S. PATENT DOCUMENTS 2,617,777 A * 11/1952 Kleine ................. C08J 3/091
524/113
4,843,117 A 6/1989 Chung
2011/0127066 A1 6/2011 Baker et al.

FOREIGN PATENT DOCUMENTS

JP 2003-286614 * 10/2003 ............... D01F 6/40
JP 2004-197255 * 7/2004 ............... C08K 3/22

OTHER PUBLICATIONS

Machine translation of JP 2004-197255 (Year: 2004).*
(Continued)

*Primary Examiner* — John E Uselding
(74) *Attorney, Agent, or Firm* — Osha Liang LLP

(57) ABSTRACT

A thermoplastic modacrylic resin composition includes a modacrylic resin and a plasticizer. The modacrylic resin includes 15 to 85 wt % of acrylonitrile, 15 to 85 wt % of vinyl chloride and/or vinylidene chloride, and 0 to 20 wt % of another vinyl monomer, and the plasticizer is an organic compound that is compatible with the modacrylic resin and has a boiling point of at least 200° C. A method for manufacturing a thermoplastic modacrylic resin composition includes melt-kneading a powder mixture obtained by mixing a modacrylic resin powder and an organic compound that is compatible with the modacrylic resin and has a boiling point of at least 200° C. Acrylic fibers are composed of a thermoplastic modacrylic resin composition.

6 Claims, 1 Drawing Sheet

(51) Int. Cl.
  *C08K 5/00*      (2006.01)
  *C08L 33/20*     (2006.01)
  *D01F 1/10*      (2006.01)
  *D01F 6/40*      (2006.01)
  *C08K 5/1575*    (2006.01)
  *C08L 27/06*     (2006.01)
  *C08F 212/14*    (2006.01)
  *C08F 220/44*    (2006.01)

(52) U.S. Cl.
  CPC ............ *C08K 5/1575* (2013.01); *C08L 27/06* (2013.01); *C08L 33/20* (2013.01); *D01F 1/10* (2013.01); *D01F 6/40* (2013.01); *C08F 212/14* (2013.01); *C08F 220/44* (2013.01); *C08L 2205/02* (2013.01); *C08L 2205/035* (2013.01)

(56) References Cited

OTHER PUBLICATIONS

Machine translation of JP 2003-286614 (Year: 2003).*
Office Action issued in corresponding U.S. Appl. No. 15/717,284; dated Jan. 21, 2020 (7 pages).

* cited by examiner

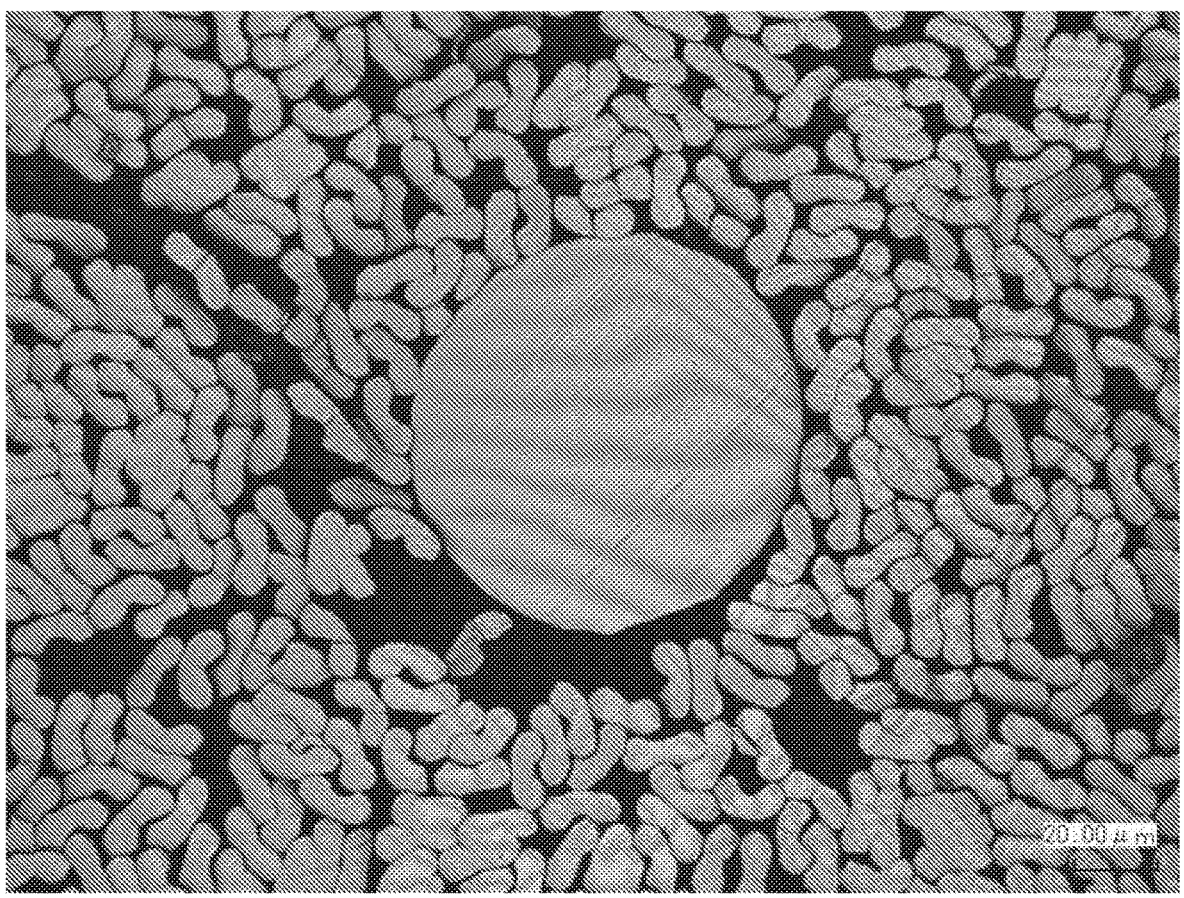

THERMOPLASTIC MODACRYLIC RESIN COMPOSITION, METHOD FOR MANUFACTURING SAME, MOLDED ARTICLE OF SAME, AND ACRYLIC FIBERS AND METHOD FOR MANUFACTURING SAME

This application is a divisional filed pursuant to 35 U.S.C. § 121 of U.S. patent application Ser. No. 15/717,284, filed Sep. 27, 2017, which is a continuation of PCT/JP2016/059670, filed on Mar. 25, 2016. The contents of the priority applications are incorporated by reference in their entirety.

TECHNICAL FIELD

One or more embodiments of the present invention relate to a melt processible thermoplastic modacrylic resin composition, a method for manufacturing the same, and a molded ankle of the same, as well as acrylic fibers and a method for manufacturing the same.

BACKGROUND

Conventionally, modacrylic fibers composed of a modacrylic resin obtained by copolymerizing acrylonitrile and a vinyl chloride monomer have been used as flame-retardant materials or artificial hair while taking advantage of their characteristics of heat resistance and/or flame retardance. Since modacrylic resins have a decomposition starting temperature that is lower than their softening temperature, they are decomposed when being melt-processed. Usually, therefore, they are fiberized by a wet spinning method (Patent Documents 1 to 3). However, in the case of the wet spinning method, the drainage load is high and the cost of solvent recovery is high. Therefore, Patent Document 4 discusses melt spinning of modacrylic fibers.

PATENT DOCUMENTS

[Patent Document 1] JP6(1994)-287806A
[Patent Document 2] JP9(1997)-52907A
[Patent Document 3] JP2005-179876A
[Patent Document 4] JP2004-360090A Patent Document 4 proposes to obtain a melt-spinnable composition by adding a (meth)acrylonitrile polymer as an agent for improving processability to a polymer containing 17 to 86 wt % of halogen atoms composed of 30 to 70 wt % of acrylonitrile and 70 to 30 wt % of halogen-containing vinyl monomers. However, a large amount of a plasticizer is required in the production of the composition of Patent Document 4. This largely deteriorates appearance, heat resistance, and spinning stability because conventional plasticizers lack compatibility with resin.

One or more embodiments of the present invention provide, by utilizing a particular plasticizer, a modacrylic resin composition with good melt processability, a method for manufacturing the same, and a molded article of the same, as well as acrylic fibers and a method for manufacturing the same.

SUMMARY

One or more embodiments of the present invention relate to a thermoplastic modacrylic resin composition including a modacrylic resin and a plasticizer, the modacrylic resin containing 15 to 85 wt % of acrylonitrile, 15 to 85 wt %) of vinyl chloride and/or vinylidene chloride, and 0 to 20 wt % of other vinyl monomers, and the plasticizer being an organic compound that is compatible with the modacrylic resin and has a boiling point of at least 200° C.

In one or more embodiments of the present invention, the thermoplastic modacrylic resin composition further may include a stabilizer, the stabilizer being at least one selected from the group consisting of an epoxy-based heat stabilizer, a hydrotalcite-based heat stabilizer, an aliphatic acid anhydride, and an alicyclic acid anhydride. The stabilizer may be at least one selected from the group consisting of poly(glycidyl methacrylate), tetrabromobisphenol A diglycidyl ether, hydrotalcite, a dodecenylsuccinic anhydride, and a hexahydrophthalic anhydride.

According to one or more embodiments of the present invention, with respect to 100 parts by weight of the modacrylic resin, the thermoplastic modacrylic resin composition may contain 0.1 to 50 parts by weight of the organic compound that is compatible with the modacrylic resin and has a boiling point of at least 200° C. In yet another embodiment, with respect to 100 parts by weight of the modacrylic resin, the thermoplastic modacrylic resin composition may contain 0.1 to 30 parts by weight of at least one of stabilizer selected from the group consisting of an epoxy-based heat stabilizer, a hydrotalcite-based heat stabilizer, an aliphatic acid anhydride, and an alicyclic acid anhydride.

In one or more embodiments of the present invention, the organic compound that is compatible with the modacrylic resin and has a boiling point of at least 200° C. is at least one selected from the group consisting of dimethyl sulfone, diethyl sulfone, dipropyl sulfone, dibutyl sulfone, diphenyl sulfone, vinyl sulfone, ethyl methyl sulfone, methyl phenyl sulfone, methyl vinyl sulfone, 3-methylsulfolane, dipropyl sulfoxide, tetramethylene sulfoxide, diisopropyl sulfoxide, methyl phenyl sulfoxide, dibutyl sulfoxide, diisobutyl sulfoxide, sulfoxide, diphenyl sulfoxide, benzyl sulfoxide, lactide lactate, pyrrolidone, ε-caprolactam, N-methylcaprolactam, γ-butyrolactone, γ-hexalactone, γ-heptalactone, γ-octalactone, ε-caprolactone, and ε-octalactone. In one or more embodiments of the present invention, the organic compound that is compatible with the modacrylic resin and has a boiling point of at least 200° C. has a melting point of at least 60° C. The organic compound that is compatible with the modacrylic resin and has a boiling point of at least 200° C. may be at least one selected from the group consisting of dimethyl sulfone and lactide lactate.

In one or more embodiments of the present invention, the thermoplastic modacrylic resin composition may be in a molten state. In yet another embodiment, in the thermoplastic modacrylic resin composition, the average transmittance for visible light in the wavelength range of 427 to 675 nm may be at least 25%.

Furthermore, one or more embodiments of the present invention relate to a method for manufacturing the thermoplastic modacrylic resin composition, the method including melt-kneading a powder mixture obtained by mixing a modacrylic resin powder and a plasticizer together to obtain a thermoplastic modacrylic resin composition, with the modacrylic resin powder being obtained by polymerizing a total of 100 parts by weight of a vinyl monomer mixture containing 15 to 85 parts by weight of acrylonitrile, 15 to 85 parts by weight of vinyl chloride and/or vinylidene chloride, and 0 to 20 parts by weight of other vinyl monomers, and the plasticizer being an organic compound that is compatible with the modacrylic resin and has a boiling point of at least 200° C.

Moreover, one or more embodiments of the present invention relate to a molded article of a thermoplastic modacrylic resin composition, the molded article being composed of the thermoplastic modacrylic resin composition and having a predetermined shape.

According to one or more embodiments of the present invention, the molded article of the thermoplastic modacrylic resin composition may be one selected from the group consisting of a film, a plate, fibers, an extrusion molded article, and an injection molded article.

Furthermore, one or more embodiments of the present invention relate to acrylic fibers, the acrylic fibers being composed of the thermoplastic modacrylic resin composition.

Moreover, one or more embodiments of the present invention relate to a method for manufacturing acrylic fibers, the method including melt-spinning the thermoplastic modacrylic resin composition to obtain acrylic fibers.

One or more embodiments of the present invention can provide a thermoplastic modacrylic resin composition with good melt processability, a method for manufacturing the same, and a molded article of the same. Furthermore, one or more embodiments of the present invention allow acrylic fibers to be manufactured by melt spinning and thus can provide acrylic fibers manufactured by melt spinning.

BRIEF DESCRIPTION OF THE DRAWINGS

The FIGURE is a laser micrograph (×1000) of the cross-sections of the acrylic fibers obtained in Example 12.

DETAILED DESCRIPTION OF THE EMBODIMENTS

The inventors of the present disclosure have found that when an organic compound that has a boiling point of at least 200° C. and is compatible with a modacrylic resin containing 15 to 85 wt % of acrylonitrile, 15 to 85 wt % of vinyl chloride and/or vinylidene chloride, and 0 to 20 wt % of other vinyl monomers is used as a plasticizer, a thermoplastic modacrylic resin composition with improved melt processability is obtained.

In one or more embodiments of the present invention, the modacrylic resin and the plasticizer are compatible with each other. In one or more embodiments of the present invention, the term "compatible" denotes that the modacrylic resin is melted when 10 mg of modacrylic resin and 2 g of a plasticizer candidate substance are placed in a 19-mL glass tube made of borosilicate glass and a silicon plug is fitted into the glass tube, which then is heated at 160° C. for 30 minutes while being stirred from time to time. Furthermore, in one or more embodiments of the present invention, the term "boiling point" denotes the normal boiling point under the condition of 1 atmospheric pressure (760 mmHg).

In terms of excellent sense of touch, the modacrylic resin may contain 15 to 85 wt % of acrylonitrile, 15 to 85 wt % of vinyl chloride, and 0 to 20 wt % of other vinyl monomers.

In terms of improving heat resistance, the modacrylic resin may contain acrylonitrile in an amount of at least 20 wt %, or at least 25 wt %, or at least 30 wt % In terms of improving flame retardance, the modacrylic resin may contain vinyl chloride and/or vinylidene chloride in an amount of at least 20 wt %, or at least 25 wt %, or at least 30 wt %. In terms of achieving a good balance between heat resistance and flame retardance, the modacrylic resin may contain acrylonitrile in an amount of not more than 80 wt %, or not more than 75 wt %, or not more than 70 wt %. Moreover, the modacrylic resin may contain vinyl chloride and/or vinylidene chloride in an amount of not more than 80 wt %, or not more than 75 wt %, or not more than 70 wt %. In terms of balancing processability, heat resistance, flame retardance, colorability, and dyeability, the modacrylic resin may contain other vinyl monomers in an amount of 0.1 to 1.5 wt %, or 0.1 to 10 wt %.

The modacrylic resin is one obtained by copolymerizing a total of 100 parts by weight of a vinyl monomer mixture containing 15 to 85 parts by weight of acrylonitrile, 15 to 85 parts by weight of vinyl chloride and/or vinylidene chloride, and 0 to 20 parts by weight of other vinyl monomers.

In terms of excellent sense of touch, the modacrylic resin may be one obtained by copolymerizing a total of 100 parts by weight of a vinyl monomer mixture containing 15 to 85 parts by weight of acrylonitrile, 15 to 85 parts by weight of vinyl chloride, and 0 to 20 parts by weight of other vinyl monomers.

In terms of improving heat resistance, the vinyl monomer mixture may contain acrylonitrile in an amount of at least 20 parts by weight, or at least 25 parts by weight, or at least 30 parts by weight, with the total weight of the vinyl monomer mixture being taken as 100 parts by weight. In terms of improving flame retardance, the vinyl monomer mixture may contain vinyl chloride and/or vinylidene chloride in an amount of at least 20 parts by weight, or at least 25 parts by weight, or at least 30 parts by weight, with the total weight of the vinyl monomer mixture being taken as 100 parts by weight. In terms of achieving a good balance between heat resistance and flame retardance, the vinyl monomer mixture may contain acrylonitrile in an amount of not more than 80 parts by weight, or not more than 75 parts by weight, or not more than 70 parts by weight, with the total weight of the vinyl monomer mixture being taken as 100 parts by weight. Furthermore, the vinyl monomer mixture may contain vinyl chloride and/or vinylidene chloride in an amount of not more than 80 parts by weight, or not more than 75 parts by weight, or not more than 70 parts by weight, with the total weight of the vinyl monomer mixture being taken as 100 parts by weight. In terms of balancing processability, heat resistance, flame retardance, colorability, and dyeability, the vinyl monomer mixture may contain other vinyl monomers in an amount of 0.1 to 15 parts by weight, or 0.1 to 10 parts by weight, with the total weight of the vinyl monomer mixture being taken as 100 parts by weight.

Other vinyl monomers are not particularly limited as long as they are vinyl monomers other than acrylonitrile, vinyl chloride, and vinylidene chloride. Other vinyl monomers may be used individually or in combination of two or more thereof.

In terms of increasing adsorption to pigments, other vinyl monomers to be used may be acid functional group-containing vinyl monomers. Examples of the acid functional group-containing vinyl monomers include carboxylic acid-based monomers and sulfuric acid-based monomers. Examples of carboxylic acid-based monomers include carboxylic acid (such as acrylic acid or methacrylic acid) group-containing vinyl monomers and salts thereof. Examples of sulfuric acid based monomers include vinyl monomers containing a sulfuric acid group such as a vinyl sulfuric acid, styrenesulfonic acid, allyl sulfonic acid, methallylsulfonic acid, 2-acrylamido-2-methylpropanesulfonic acid, or isoprenesulfonic acid group, and salts thereof.

Furthermore, in terms of improving the processability by reducing the process temperature achieved by reducing the glass transition temperature of the modacrylic resin and suppressing coloration caused thereby, other vinyl monomers to be used may be, for example, alkyl (meth)acrylate, 1-vinyl esters, styrene, and derivatives thereof. Examples of alkyl (meth)acrylate include methyl (meth)acrylate, ethyl (meth)acrylate, butyl (meth)acrylate, isobutyl (meth)acrylate, 2-ethylhexyl (meth)acrylate, lauryl (meth)acrylate, stearyl (meth)acrylate, and oleyl (meth)acrylate. Examples of 1-vinyl esters include vinyl formate and vinyl acetate. Examples of styrene-based vinyl monomers include styrene, α-methylstyrene, and styrene derivatives such as indene. In one or more embodiments of the present invention, (meth)acrylate denotes acrylate and/or methacrylate.

Furthermore, in terms of improving heat resistance by increasing the glass transition temperature of the modacrylic resin, other vinyl monomers to be used may be vinyl halides such as vinyl bromide, 1,1-dibromoethene, vinyl iodide, and 1,1-diiodoethene other than vinyl chloride and vinylidene chloride.

Moreover, in terms of providing the modacrylic resin with water-repellent and oil-repellent functions, other vinyl monomers to be used may be vinyl fluorides such as vinyl fluoride and 1,1-difluoroethene.

The above-mentioned modacrylic resin can be obtained by radical polymerization of acrylonitrile vinyl chloride and/or vinylidene chloride, and other vinyl monomers. The polymerization method is not particularly limited and can be carried out by, for example, suspension polymerization or solution polymerization. In one or more embodiments of the present invention, the polymerization method may be aqueous suspension polymerization since polymer particles can be separated and washed easily after polymerization. The suspension polymerization is not particularly limited and can be carried out by a known common method.

For the radical polymerization, for example, a thiol group-containing compound such as 2-mercaptoethanol, 2-mercaptoethylamine, thioglycollic acid, mercaptopropionic acid, thioglycerol, 3-mercapto-1,2-propanediol, or dodecyl mercaptan or α-methylstyrene dimer may be used as a chain transfer agent. Furthermore, for example, a dithiobenzoate-based compound, a trithiocarbonate-based compound, a dithiocarbamate-based compound, or a xanthate-based compound can also be used as a reversible addition-fragmentation chain transfer agent.

The organic compound that is compatible with the modacrylic resin and has a boiling point of at least 200° C. (hereinafter, also referred to simply as a "plasticizer for modacrylic resin") is not particularly limited as long as it is an organic compound that is compatible with the modacrylic resin and has a boiling point of at least 20° C. Examples of the plasticizer for modacrylic resin that can be used include sulfone-based compounds such as dimethyl sulfone, diethyl sulfone, dipropyl sulfone, dibutyl sulfone, diphenyl sulfone, vinyl sulfone, ethyl methyl sulfone, methyl phenyl sulfone, methyl vinyl sulfone, and 3-methylsulfolane; sulfoxide-based compounds such as dipropyl sulfoxide, tetramethylene sulfoxide, diisopropyl sulfoxide, methyl phenyl sulfoxide, dibutyl sulfoxide, diisobutyl sulfoxide, di-p-tolyl sulfoxide, diphenyl sulfoxide, and benzyl sulfoxide lactides such as lactide lactate; lactams such as pyrrolidone, ε-caprolactam, and N-methylcaprolactam; and lactones such as γ-butyrolactone, γ-hexalactone, γ-heptalactone, γ-octalactone, ε-caprolactone, and ε-octalactone. Furthermore, the plasticizers for modacrylic resin may be used individually or in combination of two or more thereof.

When fibers are maintained at a higher temperature than their melting point, the plasticizer for modacrylic resin may become liquid to leach out to fiber surfaces, which results in a deterioration in the appearance and sense of touch of the fibers. Specifically, when the temperature returns to room temperature (25±5° C.) afterwards, the plasticizer tends to become solid and thereby the fibers adhere to one another. For example, since the room temperature in an inboard container may increase up to 60° C. during overseas transportation and the temperature also increases to 90° C. during the fiber processing, although for a short time, the melting point of the plasticizer for modacrylic resin may be at least 60° C., or at least 90° C. It is possible to use, for example, dimethyl sulfone, lactide lactate, or ε-caprolactam.

The thermoplastic modacrylic resin composition may contain the organic compound that is compatible with the modacrylic resin and has a boiling point of at least 200° C. in an amount of 0.1 to 50 parts by weight, or 0.5 to 30 parts by weight, or 1 to 20 parts by weight, with respect to 100 parts by weight of the modacrylic resin. For example, in the case where dimethyl sulfone is used, 5 parts by weight or more thereof results in good melt processability, and when 20 parts by weight of dimethyl sulfone is mixed together, the melt process can be carried out at a lower temperature, for example, even at 115° C. that is higher than the melting point of dimethyl sulfone by 5° C. In the case of 50 parts by weight or less, good melt processability is obtained, and the resin viscosity in melt-kneading increases and thereby kneading efficiency tends to improve.

The thermoplastic modacrylic resin composition may further contain a stabilizer to have thermal stability. The stabilizer is not particularly limited as long as it provides thermal stability in terms of suppressing coloration in brown or red while improving melt processability, the stabilizer may be at least one of stabilizer (hereinafter, also referred to simply as a "stabilizer for modacrylic resin") selected from the group consisting of an epoxy-based heat stabilizer, a hydrotalcite-based heat stabilizer, an aliphatic acid anhydride, and an alicyclic acid anhydride, such as an epoxy-based heat stabilizer and/or a hydrotalcite-based heat stabilizer. Furthermore, in terms of improving, transparency, the stabilizer for modacrylic resin may be an epoxy-based heat stabilizer and/or a hydrotalcite-based heat stabilizer that have a boiling point of at least 200° C.

Examples of the epoxy-based heat stabilizer that can be used include a homopolymer or copolymer of at least one of vinyl monomers selected from the group consisting of butyl glycidyl ether, neopentyl glycol diglycidyl ether phenyl glycidyl ether, o-cresyl glycidyl ether, m-/p-cresyl glycidyl ether, glycidyl methacrylate, 1,6-hexanediol diglycidyl ether, trimethylolpropane polyglycidyl ether, diglycidyl hexahydrophthalate, hydrogenated bisphenol-A glycidyl ether, propylene glycol diglycidyl ether, tripropylene glycol diglycidyl ether, polypropylene glycol diglycidyl ether, fatty acid-modified epoxy, diethylene glycol diglycidyl ether, polyethylene glycol diglycidyl ether, glycerol polyglycidyl ether, diglycerol polyglycidyl ether, polyglycerol polyglycidyl ether, sorbitol-based polyglycidyl ether, 1,3,5-tris(2,3-epoxypropyl)-1,3,5-triazine, tetrahydrophthalic acid diglycidyl ester, and glycidyl acrylate. In terms of coloration suppression and transparency, it is possible to use, for example, poly(glycidyl methacrylate), a copolymer of glycidyl methacrylate, tetrabromobisphenol A diglycidyl ether, diglycidyl hexahydrophthalate, or hydrogenated bisphenol-A glycidyl ether. For example, poly(glycidyl methacrylate), a copolymer of glycidyl methacrylate, or tetrabromobisphenol A diglycidyl ether may be used, which has a boiling point of at least 200° C. and is in a solid form at 50° C.

The hydrotalcite-based heat stabilizer is not particularly limited as long as it is a hydrotalcite compound. It may be a natural product or may be a synthetic product. For example, ALCAMIZER (registered trade name) manufactured by Kyowa Chemical Industry Co., Ltd. can be used.

The aliphatic acid anhydride is not particularly limited as long as it does not volatilize during melt processing and has a heat stabilizing effect. For example, an alkenyl succinic anhydride such as a dodecenylsuccinic anhydride (a 2-dodecen-1-ylsuccinic anhydride), a 2-octen-1-ylsuccinic anhydride, or a 2-hexadecen-1-ylsuccinic anhydride can be used. Specifically, for example, "RIKACID OSA" or "RIKACID DDSA" (product names) manufactured by New Japan Chemical Co., Ltd. or "PDSA-DA" manufactured by Sanyo Chemical industries, Ltd. can be used.

The alicyclic acid anhydride is not particularly limited as long as it has a heat stabilizing effect. For example, a hexahydrophthalic anhydride, a methylhexahydrophthalic anhydride, a methyltetrahydrophthalic anhydride, or a methyl-3,6-endomethylene-1,2,3,6-tetrahydrophthalic anhydride cart be used. Specifically, for example, "RIKACID HH," "RIKACID MH," or "RIKACID MH-700G" (product names) manufactured by New Japan Chemical Co., Ltd. or "HN-2200," "HN-2000," "HN-5500," or "MHAC-P" manufactured by Hitachi Chemical Co., Ltd. can be used.

The thermoplastic modacrylic resin composition may contain at least one of stabilizer selected from the group consisting of an epoxy-based heat stabilizer, a hydrotalcite-based heat stabilizer, an aliphatic acid anhydride, and an alicyclic acid anhydride in an amount of 0.1 to 30 parts by weight, or 0.2 to 20 parts by weight, or 0.5 to 10 parts by weight, with respect to 100 parts by weight of the modacrylic resin. In the case of at least 0.1 part by weight, a high coloration suppressing effect is obtained. Furthermore, in the case of 30 parts by weight or less, a high coloration suppressing effect is obtained and transparency can be ensured and furthermore, degradation in mechanical properties of a modacrylic resin molded body is minimal.

The thermoplastic modacrylic resin composition may contain other stabilizers in addition to the above-mentioned stabilizer for modacrylic resin as required. These other stabilizers are other than the stabilizer for modacrylic resin and are not limited as long as they have thermal stability and/or a coloration suppressing effect. For example, metal soap, organic phosphite, and tin stabilizers can be used. These other stabilizers may be used individually or in combination of two or more thereof. The amount of other stabilizers to be added is not limited as long as it is not more than 10 parts by weight with respect to 100 parts by weight of the modacrylic resin.

The thermoplastic modacrylic resin composition may contain a lubricant, within a range where one or more embodiments of the present invention are not impaired, in terms of reducing the heat generation caused by the friction and shear between the modacrylic resin and a processing machine and improving fluidity and mold releasability Examples of the lubricant that can be used include fatty acid ester-based lubricants such as stearic acid monoglyceride, stearyl stearate, hydrocarbon-based lubricants such as liquid paraffin, paraffin wax, and synthetic polyethylene wax, fatty acid-based lubricants such as stearic acid, higher alcohol-based lubricants such as stearyl alcohol, aliphatic amide-based lubricants such as stearic acid amide, oleic acid amide, and erucic acid amide, alkylene fatty acid amide-based lubricants such as methylene bis stearic acid amide and ethylene bis stearic acid amide, as well as metal soap-based lubricants such as lead stearate, zinc stearate, calcium stearate, and magnesium stearate. These may be used individually or in combination of two or more thereof. The amount of lubricant to be added is not limited as long as it is not more than 10 parts by weight with respect to 100 parts by weight of the modacrylic resin.

The thermoplastic modacrylic resin composition may contain a processing aid such as an acrylic-based processing aid, within a range where one or more embodiments of the present invention are not impaired. When fibers are composed of the thermoplastic modacrylic resin composition, a (meth)acrylate-based polymer and/or a styrene-acrylonitrile copolymer may be contained as a processing aid in terms of improving spinnability. Examples of the (meth)acrylate-based polymer that can be used include copolymers of (meth)acylate with a copolymer component such as butyl (meth)acrylate, isobutyl (meth)acrylate, 2-ethylhexyl (meth)acrylate, styrene, vinyl acetate, or acrylonitrile. Furthermore, examples of the (meth)acylate-based polymer that can be used include those commercially available, for example, "Kane Ace PA20" and "Kane Ace PA101" manufactured by Kaneka Corporation. The amount of processing aid to be added is not limited as long as it is not more than 3 parts by weight with respect to 100 parts by weight of the modacrylic resin.

The thermoplastic modacrylic resin composition is used in a molten state, that is, it can be used as a molten material. The molten material can be obtained by melt-kneading the thermoplastic modacrylic resin composition. The method of melt-kneading is not particularly limited and a general method of melt-kneading a thermoplastic resin composition can be used.

In terms of convenience of operation, first, the plasticizer for modacrylic resin is mixed with the modacrylic resin powder and thereby a powder mixture is obtained. In terms of easiness in mixing, the modacrylic resin powder may have a moisture content of not more than 2 mass %, or not more than 0.5 mass %. The moisture content of the modacrylic resin can be measured under the conditions of 160° C. and 10 minutes using a heating and drying method moisture analyzer MX manufactured by A&D Company, Limited. In one or more embodiments of the present invention the stabilizer for modacrylic resin may be mixed in. Furthermore, for example, other stabilizers, lubricants, and processing aids are mixed in as required. In one or more embodiments of the present invention, the term "powder" denotes that the mean particle size is at least 1 μm. Moreover, the mean particle size denotes D50 (a median size) measured with a Laser Scattering Particle Size Distribution Analyzer "Partica LA-950V2" manufactured by HORIBA, Ltd. For the above-mentioned mixing, for example, a mixer such as a Henschel mixer, a super mixer, or a ribbon blender can be used, although not particularly limited thereto. The conditions such as temperature and time for the mixing operation are not particularly limited as long as a powder mixture can be obtained. In terms of convenience of mixing operation, the modacrylic resin powder may have a mean particle size of 10 to 500 μm, or 50 to 250 μm. In terms of easiness in obtaining a powder mixture and in terms of allowing melt-adsorption of various additives on the surface of the modacrylic resin powder as required, the temperature may be set in the range of 0 to 120° C. during the mixing operation and is reduced to a temperature that is lower than the glass transition temperature of the powder mixture by at least 10° C. at the end of the mixing operation so as to prevent the powder from fusing together or to equipment such as piping during its transfer.

Next, the powder mixture is melt-kneaded. The temperature used during the melt-kneading is at least the glass transition temperature of a kneaded mixture of the modacrylic resin and the plasticizer for modacrylic resin, and in terms of suppressing coloration that is caused by thermal decomposition of the modacrylic resin, the temperature may be 40 to 200° C. or 80 to 185° C., or 120 to 175° C., or 120 to 170° C. For kneading, for example, a kneader such as a single screw extruder a twin screw extruder, or a plastomill can be used, although not particularly limited thereto. In one or more embodiments of the present invention, the extruder may be operated at a temperature of, for example, 120 to 175° C.

According to various embodiments of the present invention, the thermoplastic modacrylic resin composition is transparent in a molten state in terms of improving the rate of expression of natural color tone of dyes or pigments when used for an application that requires toning. For example, the average transmittance for visible light in the wavelength range of 427 to 675 nm may be at least 25%, or at least 35%, or at least 40%. In one or more embodiments of the present invention, the term "transmittance" denotes one obtained by measuring the transmittance of a resin plate produced by hot-pressing the thermoplastic modacrylic resin composition in a molten state into a 1-mm thick plate. Furthermore, in one or more embodiments of the present invention the average transmittance for visible light in the wavelength range of 427 to 675 nm denotes the average between the transmittance at a wavelength of 476.59 nm and the transmittance at a wavelength of 625.31 nm.

The thermoplastic modacrylic resin composition is processed into a predetermined shape and thereby a molded article can be obtained. The molding method is not particularly limited and examples thereof include an extrusion molding method, an injection molding method, an insert molding method, a sandwich molding method, a foam molding method, a press molding method, a blow molding method, a calendar molding method, a rotational molding method, a slush molding method, a dip molding method, and a cast molding method. Examples of the molded article include a film, a plate, fibers, an extrusion molded article, and an injection molded article. The molded article may be a foamed article and may be porous. In the present invention, the term "film" denotes one that is flexible and is in a faun of a thin film with a thickness of not more than 200 μm, while the term "plate" denotes one that is not flexible and is in a form of a thin film or a plate with a thickness of at least 200 μm.

The molded article can be used suitably for applications that require flame retardance or heat resistance. The molded article can be used for, for example, automobiles, household electric appliances, industrial parts, civil engineering and construction, commodities, packaging materials, and artificial leather. Specifically, examples of the applications for vehicles such as automobiles include vehicle exterior parts, vehicle interior parts, instrument panels, consoles, door sheets, ceilings, under carpets, and trunk sheets. Examples of the applications for household electric appliances include wire coating, housings and parts for electronics products, and housings and parts for white household electric appliances. Examples of the applications for industrial pans include pipes, tubes, gaskets, parts for machinery and appliances, hot melt adhesives, heat insulating materials, and pipe protection materials. Examples of the applications for civil engineering and construction include pipes, flat plates, construction curing sheets, window frames, screen doors, sidings, decks, flooring materials, wallpapers, tile carpets, and cushion floors. Examples of general applications and the applications for commodities include shoe soles, gloves, tapes, adhesive tapes, various bottles, dolls, artificial hairs, and fabrics. Examples of the applications for packaging materials include containers, packing materials, and buffer materials. Examples of the applications for artificial leather include wallpapers, vehicle seat sheets, furniture, bags, footwear, pouches, clothing, mats, and carpets.

Acrylic fibers can be composed of the thermoplastic modacrylic resin composition. Specifically, the thermoplastic modacrylic resin composition is melt-spun and thereby acrylic fibers can be obtained, First, the thermoplastic modacrylic resin composition is melt-spun into fibrous undrawn yarns. Specifically, a melt-kneaded mixture of the thermoplastic modacrylic resin composition melt-kneaded with an extruder, for example, a single screw extruder, a counter-rotating twin screw extruder, or a conical twin screw extruder, is discharged from a spinning nozzle by the extruder and then is passed through a heating cylinder to be increased in temperature up to at least a temperature that allows a fiberized product of the thermoplastic modacrylic resin composition to be taken off by a take-off machine, and thereafter it is taken up while being cooled to a temperature equal to or lower than the glass transition point by a method such as air cooling or forced-air cooling, thus forming undrawn yarns. In one or more embodiments of the present invention, the extruder may be operated in the temperature range of, for example, 120 to 220° C. The ratio of the take-up speed to the discharge speed is not particularly limited, but the fiberized product may be taken up at a speed ratio in the range of, for example, 1 to 100 times. The diameter of the spinning nozzle is not particularly limited but may be, for example, 0.05 to 2 mm, or 0.1 to 1 mm. In one or more embodiments of the invention, extrusion may be carried out at a temperature equal to or higher than the temperature that prevents a material discharged from the spinning nozzle from exhibiting melt fracture. The temperature of the spinning nozzle may be at least 160° C., or at least 170° C. The temperature of the heating cylinder may be at least 250° C., or at least 280° C. The cooling temperature may be −196 to 40° C., or 0 to 30° C. by air cooling and may be 5 to 6° C., or 10 to 40° C. by water cooling.

The undrawn yarns obtained above can be subjected to a drawing treatment and a thermal relaxation treatment by known methods. For example, when used as artificial hair, they may be produced as fibers having a single fiber fineness of 2 to 100 dtex. With respect to the conditions for the drawing treatment, the draw ratio may be set to be around 1.1 to 6 times, or around 2 to 4.5 times, in a thy heat atmosphere with a drawing treatment temperature of 70 to 150° C. The fibers that have been subjected to the drawing treatment may be subjected to a thermal relaxation treatment to be relaxed at a relaxation rate of 1 to 50%, or at a relaxation rate of 2 to 40%, and thereby the thermal shrinkage rate can be reduced. Furthermore, in order also to smoothen the unevenness of the fiber surfaces to obtain a smooth texture similar to that of human hair, the thermal relaxation treatment may be used. Moreover, it is also possible to wash undrawn yarns or drawn yarns with water to control the fineness. In one or more embodiments of the present invention, the single fiber fineness may be measured according to JIS L 1013.

EXAMPLES

One or more embodiments of the present invention are described in further details using the following examples. However, the present invention is not limited to the following examples. In the following, unless otherwise indicated, the term "part(s)" denotes part(s) by weight and "%" denotes wt %.

Synthesis Example 1

With respect to 40.4 parts by weight of acrylonitrile and 59.1 parts by weight of vinyl chloride, 270 parts by weight of ion exchanged water was used, and 0.1 part by weight of ammonium persulphate, 0.09 part by weight of sodium sulfite, and 0.07 part by weight of sulfuric acid (62.5 to 63.5 wt %) as polymerization initiators as well as 0.8 part by weight of sodium lauryl sulfate as a surfactant were used. With the pH in the polymerization system being adjusted to 2.3, emulsion polymerization was carried out at a polymerization temperature of 39° C. for a polymerization time of 7 hours. Thus, a modacrylic resin latex was obtained. During the polymerization, 0.5 part by weight of sodium styrenesulfonate was continuously added to the polymerization system in an equal amount from two hours to six hours after the initiation of the polymerization. Furthermore, 29.6 parts by weight of 40.4 parts by weight of acrylonitrile used herein was continuously added to the polymerization system in an equal amount from immediately after the initiation of the polymerization to 6.5 hours thereafter as polymerization progresses. Furthermore, in order to keep the polymerization rate constant, a part (0.09 part by weight) of the ammonium persulphate used herein was continuously added. The polymer thus obtained was composed of 49.4 wt %) of acrylonitrile, 50.0 wt %) of vinyl chloride, and 0.6 wt % of sodium styrenesulfonate. After that, salting-out, dehydration, water washing, dehydration, and drying treatments were carried out by common methods and thereby a modacrylic resin powder (with a mean particle size of 70 μm and a moisture content of 0.3 mass %) was obtained. The mean particle size of the modacrylic resin is D50 measured using a Laser Scattering Particle Size Distribution Analyzer "Partica LA-950V2" manufactured by HORIBA Ltd. The moisture content of the modacrylic resin was measured under the conditions of 160° C. and 10 minutes using a heating and drying method moisture analyzer MX manufactured by A&D Company, Limited.

Evaluation Examples 1 to 20

10 mg of the modacrylic resin obtained in Synthesis Example 1 was placed in a 19-mL glass tube made of borosilicate glass, and 2.0 g of a compound indicated in Table 1 below was added thereto. Thereafter, a silicon plug was inserted into the glass tube. Then an operation, in which it was immersed in an oil bath set at 160° C. was taken out of the oil bath every five minutes, was stirred with a vortex mixer for five seconds, and then was put back into the oil bath, was repeated six times, and thus it was heated at 160° C. for a total of 30 minutes. After 30 minutes, it was visually checked whether the modacrylic resin was dissolved uniformly in the compound. The results are shown in Table 1 below

TABLE 1

| | Compound | Solubility of Modacrylic Resin |
|---|---|---|
| Evaluation Ex. 1 | Dimethyl sulfone | Dissolved |
| Evaluation Ex. 2 | Lactide lactate | Dissolved |

TABLE 1-continued

| | Compound | Solubility of Modacrylic Resin |
|---|---|---|
| Evaluation Ex. 3 | ε-Caprolactam | Dissolved |
| Evaluation Ex. 4 | γ-Butyrolactone | Dissolved |
| Evaluation Ex. 5 | ε-Caprolactone | Dissolved |
| Evaluation Ex. 6 | Dimethyl sulfoxide | Dissolved |
| Evaluation Ex. 7 | N,N-Dimethylformamide | Dissolved |
| Evaluation Ex. 8 | N,N-Dimethylacetamide | Dissolved |
| Evaluation Ex. 9 | Epoxidized soybean oil (manufactured by DIC, W-100-EL) | Undissolved |
| Evaluation Ex. 10 | Bis(2-ethylhexyl) phthalate | Undissolved |
| Evaluation Ex. 11 | Tris(2-ethylhexyl) trimellitate | Undissolved |
| Evaluation Ex. 12 | Bis(2-ethylhexyl) adipate | Undissolved |
| Evaluation Ex. 13 | Stearic acid | Undissolved |
| Evaluation Ex. 14 | Methyl stearate | Undissolved |
| Evaluation Ex. 15 | Polyester adipate (manufactured by ADEKA, W-230-H) | Undissolved |

Example 1

To 100 parts by weight of the modacrylic resin powder obtained in Synthesis Example 1, 20 parts by weight of dimethyl sulfone as a plasticizer, 10 parts by weight of poly(glycidyl methacrylate) (manufactured by NOF Corporation, product name "Marproof (registered trade name) G01100") as a stabilizer, as well as 0.5 part by weight of (meth)acrylate-based polymer (manufactured by Kaneka Corporation, product name "Kane Ace PA20"), 0.5 part by weight of calcium stearate, 1.2 parts by weight of magnesium stearate, 0.8 part by weight of synthetic polyethylene wax, and 0.7 part by weight of stearic acid (manufactured by NOF Corporation, product name "Stearic Acid Sakura") as other additives were added, which then was increased in temperature to 110° C. while being mixed together using a Henschel mixer. Thereafter, it was cooled down to 50° C. and thereby a powder mixture was obtained. Subsequently, 62 g of the powder mixture was kneaded with a Labo Plastomill (manufactured by Toyo Seiki Seisaku-sho, Ltd., model number "4C150") under the conditions of 145° C., 50 rpm, and 4.5 minutes and thus a melt-kneaded mixture was obtained.

Example 2

A melt-kneaded mixture was obtained in the same manner as in Example 1 except that 10 parts of hydrotalcite (manufactured by Kyowa Chemical Industry Co., Ltd., product name "ALCAMIZER (registered trade name) 1") was used instead of 10 parts of poly(glycidyl methacrylate).

Example 3

A melt-kneaded mixture was obtained in the same manner as in Example 2 except that melt-kneading was carried out under the conditions of 115° C. and 20 rpm for two minutes and then was further carried out under the conditions of 115° C. and 50 rpm for 4.5 minutes.

Example 4

A melt-kneaded mixture was obtained in the same manner as in Example 1 except that 10 parts of tetrabromobisphenol A diglycidyl ether (manufactured by Sakamoto Yakuhin Kogyo Co., Ltd., product name "SR-BSP") was used instead of 10 parts of poly(glycidyl methacrylate).

Example 5

A melt-kneaded mixture was obtained in the same manner as in Example 1 except that 10 parts of dodecenylsuccinic anhydride (manufactured by New Japan Chemical Co., Ltd., product name "RIKACID DDSA") was used instead of 10 parts of poly(glycidyl methacrylate).

Example 6

A melt-kneaded mixture was obtained in the same manner as in Example 1 except that 10 parts of hexahydrophthalic anhydride (manufactured by New Japan Chemical Co., Ltd., product name "RIKACID HH") was used instead of 10 parts of poly(glycidyl methacrylate).

Example 7

A melt-kneaded mixture was obtained in the same manner as in Example 1 except that 20 parts of lactide lactate was used instead of 20 parts of dimethyl sulfone and 5 parts of tetrabromobisphenol A diglycidyl ether (manufactured by Sakamoto Yakuhin Kogyo Co., Ltd., product name "SR-BSP") was used instead of 10 parts of poly(glycidyl methacrylate).

Example 8

A melt-kneaded mixture was obtained by the same operation carried out as in Example 1 except that 10 parts of poly(glycidyl methacrylate) was not added.

Example 9

A melt-kneaded mixture was obtained in the same manner as in Example 1 except that 10 parts of hydrotalcite (manufactured by Kyowa Chemical Industry Co., Ltd., product name "ALCAMIZER (registered trade name) 5") was used instead of 10 parts of poly(glycidyl methacrylate).

Example 10

A melt-kneaded mixture was obtained in the same manner as in Example 1 except that the addition rate of dimethyl sulfone was changed from 20 parts to 10 parts and 10 parts of poly(glycidyl methacrylate) was not added.

Comparative Example 1

Kneading was carried out in the same manner as in Example 1 except that the plasticizer and the stabilizer were not added. However, it was not possible to carry out sufficient kneading and thus no melt-kneaded mixture was obtained. Instead, a resin mass was obtained.

Comparative Example 2

Kneading was carried out in the same manner as in Example 10 except that 10 parts of epoxidized soybean oil (manufactured by DIC, product name "W-100-EL") was used as the plasticizer. However, kneading was completely impossible and this a powder aggregate including no melt-kneaded portion was obtained.

Comparative Example 3

The same operation as in Example 1 was carried out except that 20 parts of dimethyl sulfoxide (also referred to as "DMSO") was used instead of 20 parts of dimethyl sulfone. However, during kneading, foaming occurred and odor was generated. Thus, the melt-kneading operation was not able to be carried out.

Comparative Example 4

The same operation as in Example 1 was carried out except that 20 parts of N,N-dimethylformamide (also referred to as "DMAc") was used instead of 20 parts of dimethyl sulfone. However, during kneading, foaming occurred and odor was generated. Thus, the melt-kneading operation was not able to be carried out.

Comparative Example 5

The same operation as in Example 1 was carried out except that 20 parts of N,N-dimethylacetamide (also referred to as "DMAc") was used instead of 20 parts of dimethyl supine. However, during kneading, foaming occurred and odor was generated. Thus, the melt-kneading operation was not able to be carried out.

Hot-pressed samples obtained by preparing the kneaded mixtures of Examples 1 to 10 and Comparative Examples 1 to 5 as follows were used to evaluate the melt processability thereof. The results are indicated in Table 2 below. Table 2 also indicates the mixing ratio of the thermoplastic modacrylic resin composition.

<Preparation of Hot-Pressed Samples>

Each melt-kneaded mixture or resin mass obtained after kneading was cut out to about 5 g. An aluminum block (80×60×40 mm), an aluminum plate (80×60×1 mm), a spacer aluminum plate (a U shape, 1 mm thick), and an aluminum plate (80×60×1 mm) were placed on the lower heater of a Hand Hot Press Digital HHP-2D (AS ONE) sequentially from the bottom and then were preheated for 30 minutes under the condition of 160° C. while being pressed down by the upper heater. After that, a cut-out melt-kneaded mixture or resin mass was placed under the uppermost aluminum plate (80×60×1 mm), and the aluminum plate (80×60×1 mm) was placed thereabove, which then was hand-pressed for 60 seconds. Thereafter, the aluminum plate (80×60×1 mm), the spacer aluminum plate (a U shape, 1 mm thick), and the aluminum plate (80×60×1 mm) were removed together and then were placed between stainless steel (SUS) plates (300×300×1 mm) by the upper and lower sides thereof and a weight of 2 kg was placed on the upper SUS plate, which then was cooled for 10 minutes. After the cooling operation, the aluminum jig was removed and thus a resin plate with a thickness of 1 mm was obtained.

<Melt Processability>

Based on the results of transmitted light observation of the hot-pressed samples (resin plates) obtained above using an optical microscope (BX51, manufactured by Olympus Corporation, 10× ocular lens, 20× objective lens, 200× in total), the melt processability was evaluated on the following criteria.

Good: Only less than 100 spots of powder with a particle size of at least 10 μm exist in a total of 10 visual field observations at ×200 magnification.

Poor: At least 100 spots of powder with a particle size of at least 10 μm exist in a total of 10 visual field observations at ×200 magnification.

Fail: Kneading is not able to be carried out and therefore the hot-pressed sample to be used for observation is not able to be prepared suitably.

TABLE 2

| | Modacrylic Resin (Parts) | Other Additives (Parts) | Plasticizer Type | Parts | Stabilizer Type | Parts | Melt-Knead ability |
|---|---|---|---|---|---|---|---|
| Ex. 1 | 100 | 3.7 | Dimethyl sulfone | 20 | Poly(glycidyl methacrylate) | 10 | Good |
| Ex. 2 | 100 | 3.7 | Dimethyl sulfone | 20 | Hydrotalcite | 10 | Good |
| Ex. 3 | 100 | 3.7 | Dimethyl sulfone | 20 | Hydrotalcite | 10 | Good |
| Ex. 4 | 100 | 3.7 | Dimethyl sulfone | 20 | Tetrabromobisphenol A diglycidylether | 10 | Good |
| Ex. 5 | 100 | 3.7 | Dimethyl sulfone | 20 | Dodecenylsuccinic anhydride | 10 | Good |
| Ex. 6 | 100 | 3.7 | Dimethyl sulfone | 20 | Hexahydrophthalic anhydride | 10 | Good |
| Ex. 7 | 100 | 3.7 | Lactide lactate | 20 | Tetrabromobisphenol A diglycidylether | 5 | Good |
| Ex. 8 | 100 | 3.7 | Dimethyl sulfone | 20 | — | — | Good |
| Ex. 9 | 100 | 3.7 | Dimethyl sulfone | 20 | Hydrotalcite | 10 | Good |
| Ex. 10 | 100 | 3.7 | Dimethyl sulfone | 10 | — | — | Good |
| C. Ex. 1 | 100 | 3.7 | — | — | — | — | Poor |
| C. Ex. 2 | 100 | 3.7 | Epoxidized soybean oil | 10 | — | — | Poor |
| C. Ex. 3 | 100 | 3.7 | Dimethyl sulfoxide | 20 | Poly(glycidyl methacrylate) | 10 | Fail |
| C. Ex. 4 | 100 | 3.7 | N,N-Dimethylformamide | 20 | Poly(glycidyl methaciylate) | 10 | Fail |
| C. Ex. 5 | 100 | 3.7 | N,N-Dimethylacetamide | 20 | Poly(glycidyl methacrylate) | 10 | Fail |

As can be seen from the results indicated in Table 2 above, the thermoplastic modacrylic resin compositions of Examples 1 to 10, in which an organic compound that was compatible with the modacrylic resin and had a boiling point of at least 200° C. was used as the plasticizer, had good melt processability.

On the other hand, the thermoplastic modacrylic resin compositions of Comparative Example 1, in which no plasticizer was contained, and Comparative Example 2, in which an epoxidized soybean oil was used as the plasticizer, had poor melt kneadability and no melt-kneaded mixture was able to be obtained. Furthermore, in Comparative Examples 3 to 5, in which DMSO, DMF, and DMAc that are compatible with the modacrylic resin but have a boiling point of lower than 200° C. were used as the plasticizer, during kneading, foaming occurred and odor was generated, and thus, the melt-kneading operation was not able to be carried out.

Using hot-pressed samples (resin plates) prepared as described above using the melt-kneaded mixtures of Examples 1 to 7, 9, and 10 as well as the kneaded resin mass of Comparative Example 1, the degree of coloration and transmittance were evaluated as described below. The results are indicated in Table 3 below.

<Colorimetric Test>

The lightness L*, chromaticity a*, chromaticity b* in the L*a*b* color system were measured with a spectrophotometer "CM-2600d" (manufactured by KONICA MINOLTA) using a mask with a diameter of 3 mm and thereby the degree of coloration of each hot-pressed sample (1-mm thick resin plate) was evaluated. Immediately before the sample measurement, the device was calibrated with a barium sulfate standard white plate. The L value indicates the degree of lightness. The a* value indicates that the sample exhibits coloration in green in the case of a minus value of lower than 0 and in red in the case of a plus value higher than 0, and the higher the absolute value, the more intense the color. The b* value indicates that the sample exhibits coloration in blue in the case of a minus value of lower than 0 and in yellow in the case of a plus value higher than 0, and the higher the absolute value, the more intense the color. With a copy paper (a PPC paper) being placed underneath, measurement was carried out five times with respect to each hot-pressed sample while the measurement point was changed, and the average values thereof were calculated. As a blank, similarly, using a copy paper (a PPC paper), measurement was carried out five times while the measurement point was changed, and the average values thereof were calculated. From the average value of the resultant L value, a* value, and h* value, the color difference ΔE*ab from the blank in the L*a*b* space was calculated. The calculated values are indicated in Table 3. The range of ΔE*ab was divided into four stages of criteria as follows, which were used as judgment bases for the overall judgment. A higher criteria value means a higher coloration suppressing effect.

4: ΔE*ab is 0 to 25.
3: ΔE*ab is higher than 25 but not higher than 50.
2: ΔE*ab is higher than 50 but not higher than 75.
1: ΔE*ab is higher than 75 but not higher than 100.

<Measurement of Transmittance>

The transmittance of each hot-pressed sample (1-mm thick resin plate) was measured using transmittance measurement software U6039-01 (manufactured by Hamamatsu Photonics), with a MULTI CHANNEL ANALYZER PMA-11 (manufactured by Hamamatsu Photonics) being connected to an optical microscope (manufactured by Olympus, "BX51"). 10× objective lens was used. The transmittance was measured at two points, 476.59 nm and 625.31 m. The light amount was adjusted so that the transmittance of optical glass was 4630±50 at 476.59 nm and 16100±100 at 625.31 nm. The transmittance was measured ten times while the measurement point was changed, and the average value was calculated. The average values obtained at respective wavelengths were further averaged. The transmittance can be represented by Formula 1, where T is a transmittance, α is an absorption coefficient, and x is a light path length.

[Mathematical Formula 1]

$$T = e^{-\alpha x} \qquad (1)$$

In Formula (1) above, e is the base of natural logarithm, Napier's constant. With respect to each hot-pressed plate sample, the absorption coefficient α was calculated as a value per cm of light path length. Table 3 indicates the calculated values. The range of the absorption coefficients α was divided into the following four stages of criteria, which were used as judgment bases for the overall judgment. A higher criteria value means better transparency.

4: The absorption coefficient α is 0 to 10.

3: The absorption coefficient α is higher than 10 but not higher than 20.

2: The absorption coefficient α is higher than 20 but not higher than 30.

1: The absorption coefficient α is higher than 30.

<Overall Judgment>

The total value obtained by adding up the values of judgment criteria evaluated by the colorimetric test and the transmittance measurement was used for the overall judgment. When the criteria value of each of the colorimetric test and the transmittance is at least 2 and the total value is at least 4, it was judged as good, while when the total value of the colorimetric test and the transmittance is 3 or lower, it was judged as fail. The higher the total value, the better the coloration suppression, and the better the transparency.

synthetic polyethylene wax, and 0.7 part by weight of stearic acid (manufactured by NOF Corporation, product name "Stearic Acid Sakura") as other additives were added, which then was increased in temperature to 110° C. while being mixed together using a Henschel mixer. Thereafter, it was cooled down to 50° C., and thereby a powder mixture was obtained. Subsequently, the powder mixture was extruded with the labo extruder (manufactured by Toyo Seiki Seisaku-sho, Ltd., model number "4C150", a combination of a 20-mm extrusion unit and a 2-mm strand nozzle), and thus a strand was obtained. The extruder was operated in the temperature range of 120 to 175° C. The resultant strand was air-cooled and then was pelletized.

<Spinning Process>

The resultant pellets were melt-extruded with the labo extruder (manufactured by Toyo Seiki Seisaku-sho. Ltd., model number "4C150", a combination of a 20-mm extrusion unit, a downward die for melt viscosity measurement, and a spinning nozzle with a diameter of 0.4 mm) under the conditions of an extruder temperature of 120 to 220° C., a nozzle temperature of 195° C., a heating cylinder (45 mm×50 mm) temperature of 400° C., and a linear velocity of a discharged material of 7.5 to 8.3 m/min. This was taken off at 80 m/min while being allowed to contact with a

TABLE 3

| | Colorimetry | | | | Transmittance | | | | | |
|---|---|---|---|---|---|---|---|---|---|---|
| | | a* | b* | | | | | | | |
| | L* Lightness | Green in Minus, Red in Plus | Blue in Minus, Yellow in Plus | ΔE*ab | Judgment | $\lambda_1$ | $\lambda_2$ | Average | Absorption Coefficience (per 1 cm) | Judgment | Overall Judgment |
| Ex. 1 | 83.0 | −1.85 | 40.33 | 41 | 3 | 49% | 49% | 49% | 7.1 | 4 | 7 |
| Ex. 2 | 71.2 | −0.21 | 37.80 | 45 | 3 | 26% | 31% | 29% | 12.5 | 3 | 6 |
| Ex. 3 | 75.7 | −0.91 | 37.76 | 42 | 3 | 32% | 41% | 36% | 10.1 | 3 | 6 |
| Ex. 4 | 75.3 | 0.12 | 42.76 | 47 | 3 | 28% | 41% | 34% | 10.8 | 3 | 6 |
| Ex. 5 | 69.8 | 3.05 | 47.24 | 53 | 2 | 21% | 32% | 27% | 13.2 | 3 | 5 |
| Ex. 6 | 73.2 | 1.86 | 47.60 | 52 | 2 | 28% | 40% | 34% | 10.7 | 3 | 5 |
| Ex. 7 | 67.8 | 2.86 | 50.14 | 57 | 2 | 25% | 42% | 34% | 10.8 | 3 | 5 |
| Ex. 9 | 77.8 | 1.33 | 37.38 | 41 | 3 | 9% | 5% | 7% | 26.6 | 2 | 5 |
| Ex. 10 | 44.1 | 11.06 | 27.44 | 60 | 2 | 8% | 18% | 13% | 20.3 | 2 | 4 |
| C. Ex. 1 | 55.0 | 6.78 | 31.73 | 52 | 2 | 7% | 2% | 5% | 30.8 | 1 | 3 |
| Blank | 97.3 | −0.04 | 1.74 | 0 | 4 | 100% | 100% | 100% | 0.0 | 4 | — |

$\lambda_1$ = 476.59 nm and $\lambda_2$ = 625.31 nm

From the results indicated in Table 3 above, it was found that containing a stabilizer for modacrylic resin suppressed coloration and/or improved transparency. Particularly, the use of an epoxy-based heat stabilizer or a hydrotalcite-based heat stabilizer tended to result in better effects.

Example 11

<Production of Molten Material of Modacrylic Resin Composition>

To 100 pans by weight of the modacrylic resin powder obtained in Synthesis Example 1, 20 parts by weight of dimethyl sulfone as a plasticizer, 7.5 parts by weight of tetrabromobisphenol A diglycidyl ether (manufactured by Sakamoto Yakuhin Kogyo Co., Ltd., product name "SR-BSP") and 2.5 parts by weight of hydrotalcite (manufactured by Kyowa Chemical Industry Co., Ltd., product name "ALCAMIZER (registered trade name) 1") as stabilizers, as well as 0.5 part by weight of (meth)acrylate-based polymer (manufactured by Kaneka Corporation, product name "Kane Ace PA20"), 0.5 part by weight of calcium stearate, 1.2 parts by weight of magnesium stearate, 0.8 part by weight of cooling tube, inside of which water flows, and thus undrawn yarns with a fineness of approximately 108 dtex were obtained. The resultant undrawn yarns were thy-heat drawn in a dry heat atmosphere of 105° C. at a draw ratio of 1.8 times and thereby acrylic fibers with a single fiber fineness of approximately 60 dtex were obtained.

Example 12

<Production of Molten Material of Modacrylic Resin Composition>

To 100 parts by weight of the modacrylic resin powder obtained in Synthesis Example 1, 25 parts by weight of dimethyl sulfone as a plasticizer, 2.5 parts by weight of hydrotalcite (manufactured by Kyowa Chemical Industry Co., Ltd., product name "ALCAMIZER (registered trade name) 1") as a stabilizer, as well as 0.2 part by weight of (meth)acrylate-based polymer (manufactured by Kaneka Corporation, product name "Kane Ace PA20"), 6 parts by weight of (meth)acrylate-based polymer (manufactured by Kaneka Corporation, product name "Kane Ace PA101"), 0.2 part by weight of calcium stearate, 0.3 part by weight of magnesium stearate, 0.2 part by weight of synthetic polyethylene wax, and 0.18 part by weight of stearic acid (manufactured by NOF Corporation, product name "Stearic Acid Sakura") as other additives were added, which then was increased in temperature to 110° C. while being mixed together using a Henschel mixer. Thereafter, it was cooled down to 50° C., and thereby a powder mixture was obtained. Subsequently, the powder mixture was extruded with the labo extruder (manufactured by Toyo Seiki Seisaku-sho. Ltd., model number "4C150", a combination of a 20-mm extrusion unit and a 2-mm strand nozzle), and thus a strand was obtained. The extruder was operated in the temperature range of 125 to 165° C. The resultant strand was air-cooled and then was pelletized.

<Spinning Process>

The resultant pellets were melt-extruded with the labo extruder (Manufactured by Toyo Seiki Seisaku-sho, Ltd., model number "4C150", a combination of a 20-mm extrusion unit, a downward die for melt viscosity measurement, and a spinning nozzle with a diameter of 4 mm) under the conditions of an extruder temperature of 120 to 220° C., a nozzle temperature of 31.4° C., and a linear velocity of a discharged material of 7.4 to 8.5 m/min. This was taken off at 60 m/min while being allowed to contact with a cooling tube, inside of which water flows, and thus undrawn yarns with a fineness of approximately 167 dtex were obtained. A drive roll was placed both before and after a hot water bath with an adjusted temperature of 95° C., with the drive roll being set to have an entry speed of 0.5 m/min and an exit speed of 1.0 m/min, and the undrawn yarns obtained in the spinning process were drawn in the hot water for a retention time of approximately 40 seconds. Thereafter, the fibers drawn in the hot water fixed at a length of 20 cm were placed into an oven set at 115° C. and this was maintained for two minutes. After that, they were drawn to the length 1.1 times longer than the original length and then were taken out from the oven to be air-cooled. Thus drawn yarns with a fineness of 76 dTex were obtained.

TABLE 4

| | Standard Test | | | | Knot Test | | |
|---|---|---|---|---|---|---|---|
| | Fineness (dTex) | Strength (cN/dTex) | Elongation Rate (%) | Young's Modulus (Gpa) | Fineness (dTex) | Strength (cN/dTex) | Elongation Rate (%) |
| Ex. 11 | 60.3 | 0.95 | 19.1 | 4.9 | 60.6 | 0.75 | 17.9 |
| Ex. 12 | 76.1 | 1.33 | 24.6 | 3.8 | 76.0 | 1.12 | 21.5 |

From the results of Examples 11 and 12 described above, in the thermoplastic modacrylic resin composition containing the modacrylic resin and the plasticizer, the use of the organic compound that is compatible with the modacrylic resin and has a boiling point of at least 200° C. as the plasticizer made it possible to melt-spin the thermoplastic modacrylic resin composition and thereby to obtain acrylic fibers. The cross-sections of the acrylic fibers obtained in Example 11 and 12 were observed with a laser microscope (manufactured by KEYENCE, ultra-deep color 3D profile measurement microscope "VK-9500"). The cross-sectional photograph (×1000) of the acrylic fibers of Example 12 is shown in the FIGURE. In the FIGURE, a flat cross-section object is a dummy fiber for filling used in the laser microscope observation. As can be seen from the FIGURE, the cross-sections of the acrylic fibers obtained by melt-spinning had no difference between the outer layer portion and the core part of the central portion of the fibers and were uniform and dense.

Although the disclosure has been described with respect to only a limited number of embodiments, those skilled in the art, having benefit of this disclosure, will appreciate that various other embodiments may be devised without departing from the scope of the present invention. Accordingly, the scope of the present invention should be limited only by the attached claims.

What is claimed is:

1. Acrylic fibers composed of a thermoplastic modacrylic resin composition,
wherein the thermoplastic modacrylic resin composition comprises a modacrylic resin, a plasticizer, and a stabilizer,
wherein the thermoplastic modacrylic resin composition comprises 5 to 50 parts by weight of the plasticizer with respect to 100 parts by weight of the modacrylic resin,
wherein the stabilizer is selected from the group consisting of an epoxy-based heat stabilizer, a hydrotalcite-based heat stabilizer, an aliphatic acid anhydride, and an alicyclic acid anhydride,
wherein the modacrylic resin comprises 15 to 85 wt % of acrylonitrile, 15 to 85 wt % of vinyl chloride and/or vinylidene chloride, and 0 to 20 wt % of another vinyl monomer,
wherein the plasticizer is an organic compound that is compatible with the modacrylic resin and has a boiling point of at least 200° C., and
wherein the acrylic fibers have a predetermined shape and a single fiber fineness of 60.3 to 100 dtex.

2. The acrylic fibers according to claim 1, wherein the plasticizer is at least one selected from the group consisting of: dimethyl sulfone, diethyl sulfone, dipropyl sulfone, dibutyl sulfone, diphenyl sulfone, vinyl sulfone, ethyl methyl sulfone, methyl phenyl sulfone, methyl vinyl sulfone, 3-methylsulfolane, dipropyl sulfoxide, tetramethylene sulfoxide, diisopropyl sulfoxide, methyl phenyl sulfoxide, dibutyl sulfoxide, diisobutyl sulfoxide, di-p-tolyl sulfoxide, diphenyl sulfoxide, benzyl sulfoxide, lactide, pyrrolidone, ε-caprolactam, N-methylcaprolactam, γ-butyrolactone, γ-hexalactone, γ-heptalactone, γ-octalactone, ε-caprolactone, and ε-octalactone.

3. The acrylic fibers according to claim 1, wherein the thermoplastic modacrylic resin composition comprises 0.1 to 30 parts by weight of the stabilizer with respect to 100 parts by weight of the modacrylic resin.

4. The acrylic fibers according to claim 1, wherein the plasticizer has a melting point of at least 60° C.

5. The acrylic fibers according to claim 1, wherein the plasticizer is at least one selected from the group consisting of dimethyl sulfone and lactide.

6. The acrylic fibers according to claim 1, wherein the stabilizer is at least one selected from the group consisting of poly(glycidyl methacrylate), tetrabromobisphenol A diglycidyl ether, hydrotalcite, a dodecenylsuccinic anhydride, and a hexahydrophthalic anhydride.

\* \* \* \* \*